US009185075B2

(12) United States Patent
Ke et al.

(10) Patent No.: US 9,185,075 B2
(45) Date of Patent: Nov. 10, 2015

(54) INTERNET SECURITY SYSTEM

(75) Inventors: Yan Ke, San Jose, CA (US); Yuming Mao, Milpitas, CA (US); Wilson Xu, Cupertino, CA (US); Brian Yean-Shiang Leu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1691 days.

(21) Appl. No.: 11/422,477

(22) Filed: Jun. 6, 2006

(65) Prior Publication Data

US 2006/0209836 A1   Sep. 21, 2006

Related U.S. Application Data

(63) Continuation of application No. 09/967,893, filed on Sep. 27, 2001, now Pat. No. 7,093,280.

(60) Provisional application No. 60/280,684, filed on Mar. 30, 2001.

(51) Int. Cl.
*H04L 29/06* (2006.01)
*H04L 12/46* (2006.01)
*H04L 12/931* (2013.01)
*H04L 12/947* (2013.01)

(52) U.S. Cl.
CPC ............ *H04L 63/02* (2013.01); *H04L 12/4641* (2013.01); *H04L 49/354* (2013.01); *H04L 63/0272* (2013.01); *H04L 63/20* (2013.01); *H04L 12/467* (2013.01); *H04L 12/4645* (2013.01); *H04L 49/25* (2013.01); *H04L 49/351* (2013.01); *H04L 63/0209* (2013.01); *H04L 63/08* (2013.01)

(58) Field of Classification Search
None
See application file for complete search history.

(56) References Cited

U.S. PATENT DOCUMENTS

| 5,781,550 | A |   | 7/1998 | Templin et al. |
|---|---|---|---|---|
| 5,842,040 | A |   | 11/1998 | Hughes et al. |
| 5,909,686 | A |   | 6/1999 | Muller et al. |
| 6,049,528 | A |   | 4/2000 | Hendel et al. |
| 6,088,356 | A |   | 7/2000 | Hendel et al. |
| 6,098,172 | A |   | 8/2000 | Coss et al. |
| 6,104,696 | A | * | 8/2000 | Kadambi et al. ............... 370/218 |

(Continued)

OTHER PUBLICATIONS

Lodin, S & Schuba, C. "Firewalls fend off invasions from the Net" IEEE Spectrum. Feb. 1998. pp. 26-34.*

(Continued)

*Primary Examiner* — Faruk Hamza
*Assistant Examiner* — Cassandra Decker
(74) *Attorney, Agent, or Firm* — Harrity & Harrity, LLP

(57) ABSTRACT

Methods and apparatus, including computer program products, implementing and using techniques for processing a data packet in a packet forwarding device. A data packet is received. A virtual local area network destination is determined for the received data packet, and a set of rules associated with the virtual local area network destination is identified. The rules are applied to the data packet. If a virtual local area network destination has been determined for the received data packet, the data packet is output to the destination, using the result from the application of the rules. If no destination has been determined, the data packet is dropped. A security system for partitioning security system resources into a plurality of separate security domains that are configurable to enforce one or more policies and to allocate security system resources to the one or more security domains, is also described.

30 Claims, 9 Drawing Sheets

(56) References Cited

U.S. PATENT DOCUMENTS

| | | | |
|---|---|---|---|
| 6,141,749 A | 10/2000 | Coss et al. | |
| 6,154,775 A | 11/2000 | Coss et al. | |
| 6,167,445 A * | 12/2000 | Gai et al. | 709/223 |
| 6,170,012 B1 | 1/2001 | Coss et al. | |
| 6,219,786 B1 * | 4/2001 | Cunningham et al. | 713/152 |
| 6,453,419 B1 * | 9/2002 | Flint et al. | 726/3 |
| 6,556,578 B1 * | 4/2003 | Silberschatz et al. | 370/412 |
| 6,591,303 B1 | 7/2003 | Hendel et al. | |
| 6,597,956 B1 * | 7/2003 | Aziz et al. | 700/3 |
| 6,606,315 B1 | 8/2003 | Albert et al. | |
| 6,625,150 B1 * | 9/2003 | Yu | 370/389 |
| 6,633,560 B1 | 10/2003 | Albert et al. | |
| 6,650,641 B1 | 11/2003 | Albert et al. | |
| 6,693,878 B1 * | 2/2004 | Daruwalla et al. | 370/235 |
| 6,701,437 B1 * | 3/2004 | Hoke et al. | 726/15 |
| 6,704,278 B1 | 3/2004 | Albert et al. | |
| 6,735,169 B1 | 5/2004 | Albert et al. | |
| 6,742,045 B1 | 5/2004 | Albert et al. | |
| 6,775,692 B1 | 8/2004 | Albert et al. | |
| 6,789,118 B1 | 9/2004 | Rao | 709/225 |
| 6,944,183 B1 * | 9/2005 | Iyer et al. | 370/466 |
| 6,952,728 B1 | 10/2005 | Alles et al. | 709/224 |
| 6,975,592 B1 * | 12/2005 | Seddigh et al. | 370/230 |
| 7,032,037 B2 | 4/2006 | Garnett et al. | |
| 7,042,870 B1 | 5/2006 | Albert et al. | |
| 7,047,561 B1 * | 5/2006 | Lee | 726/12 |
| 7,051,066 B1 | 5/2006 | Albert et al. | |
| 7,055,171 B1 * | 5/2006 | Martin et al. | 726/3 |
| 7,096,495 B1 * | 8/2006 | Warrier et al. | 726/15 |
| 7,117,530 B1 * | 10/2006 | Lin | 726/15 |
| 7,143,438 B1 | 11/2006 | Coss et al. | |
| 7,296,291 B2 * | 11/2007 | Tahan | 726/11 |
| 7,346,686 B2 | 3/2008 | Albert et al. | |
| 7,535,907 B2 | 5/2009 | Hussain et al. | |
| 7,643,481 B2 | 1/2010 | Kadambi et al. | |
| 7,778,254 B2 | 8/2010 | Kadambi et al. | |
| 7,895,431 B2 | 2/2011 | Bouchard et al. | |
| 8,023,413 B2 | 9/2011 | Kadambi et al. | |
| 2001/0009025 A1 | 7/2001 | Ahonen | |
| 2001/0034831 A1 | 10/2001 | Brustoloni | |
| 2002/0049902 A1 | 4/2002 | Rhodes | |
| 2002/0066036 A1 | 5/2002 | Makineni | |
| 2002/0067831 A1 | 6/2002 | Zhu | |
| 2002/0078384 A1 | 6/2002 | Hippelainen | |
| 2005/0165966 A1 * | 7/2005 | Gai et al. | 709/249 |

OTHER PUBLICATIONS

U.S. Appl. No. 60/256,578, filed Dec. 18, 2000.*
Julkunen et al., "Enhance Network Security with Dynamic Packet Filter", IEEE (1998), pp. 268-275.
Sharp et al., "Starburst: Building Next-Generation Internet Devices", Bell Labs Technical Journal6(2), pp. 6-17 (2002).

* cited by examiner

INTERNET SECURITY SYSTEM

CROSS-REFERENCE TO RELATED APPLICATIONS

This application is a continuation of U.S. patent application Ser. No. 09/967,893 filed, Sep. 27, 2001, the disclosure of which is incorporated herein by reference, which claims the benefit of prior U.S. provisional application 60/280,684, filed Mar. 30, 2001.

BACKGROUND

The invention relates to an Internet security system. The growth of the Internet and high-traffic web sites that require high performance and high bandwidth networks have resulted in an increased number of so-called service providers, including Internet data centers, application service and security service providers. A service provider, including an Internet data center, provides network resources, one or more dedicated servers and, in some cases, physical space, to host services for a number of customers, usually for a fee. Conventionally, service providers must install and configure one or more dedicated servers to support each customer and will likely require complex networks to manage separate services for the service provider's customer base. In this environment, the customer typically has some administrative control of the servers and control of the content residing on the servers. An Internet data center typically provides the network, network access, hardware, software and infrastructure needed to power the service, including web site, managed security, and so on.

An exemplary view of the organization of a conventional Internet data center is shown in FIG. 1. In the present example, the Internet data center (100) has a number of customers A, B, C, D. The Internet data center (100) shown in FIG. 1 is set up for four customers only, while in reality a data center may host hundreds or potentially thousands of users. Each customer has one or more dedicated servers (105), a dedicated firewall (110) and one or more switches (115) that are all connected and form a subnet (120) for that particular customer. The subnets (120) are coupled together in the core switch fabric (125), which in turn forms an interface to the Internet.

The conventional model for organizing an Internet data center requires that a separate firewall device be deployed every time a new customer joins the Internet data center, which may require network re-configuration, and be a labor intensive and costly task. In this environment, the staff at the Internet data center must separately configure, upgrade, manage and support each firewall device separately. The conventional way for organizing Internet data centers also requires a heavy need for physical rack space to accommodate the physical installation of separate firewall and other networking devices upon which the provider's services are hosted. As a result of the large amount of separate equipment, the wiring and related switching and routing infrastructure becomes complex. If a firewall fails, it will be costly to repair or replace and the down time the client experiences before his or her firewall has been repaired or replaced may be considerable. The down time can be reduced if redundant boxes are provided, but this solution leads in turn to increased cost, space, maintenance and wiring problems, and is therefore not a desirable solution

SUMMARY

In general, in one aspect, this invention provides methods and apparatus, including computer program products, implementing and using techniques for processing data packets transferred over a network. The data processing system includes a firewall engine that can receive a set of firewall policies and apply the firewall policies to a data packet, an authentication engine that can receive a set of authentication policies and authenticate a data packet in accordance with the authentication policies, one or more virtual private networks that each have an associated destination address and policies and a controller that can detect an incoming data packet, examine the incoming data packet for a virtual private network destination address and identify the policies associated with the virtual private network destination. If the policies include firewall policies, then the controller can call the firewall engine and apply the set of firewall policies corresponding to the virtual private network destination to the data packet. If the policies include authentication policies, then the controller can call the authentication engine and apply the set of authentication policies corresponding to the virtual private network destination to the data packet. The controller can also route the data packet to the virtual private network containing the data packet's destination address.

Advantageous implementations can include one or more of the following features. The controller can route the data packet by reading a set of entries in a private routing table and outputting the data packet to its virtual private network destination address using a routing protocol associated with the packet's virtual private network destination address.

In general, in one aspect, this invention provides methods and apparatus, including computer program products, implementing and using techniques for processing a data packet in a packet forwarding device. A data packet is received and a virtual local area network destination is determined for the received data packet, including identifying a set of rules that are associated s with the virtual local area network destination. The set of rules is applied to the data packet and if a virtual local area network destination has been determined for the received data packet, the data packet is output to its virtual local area network destination, using the result from the application of the rules. If a virtual local area network destination has not been determined for the received data packet, the data packet is dropped.

Advantageous implementations can include one or more of the following features. A traffic policy can be applied to the received data packet, the traffic policy being associated with the packet forwarding device and applied to all data packets processed by the packet forwarding device. Determining a virtual local area network destination can include extracting layer information from the data packet and using the extracted layer information to determine a virtual local area network destination for the data packet. The layer information can include layer 2 information, layer 3 information, layer 4 information and layer 7 information. Applying the rules to the data packet can include shaping the data packet based on the virtual local area network destination and discarding the data packet if no virtual local area network destination is determined. Shaping the data packet can include attaching a digital address tag to the data packet, the digital address tag identifying a virtual local area network destination. The digital address tag can be read and the data packet can be output using the digital address tag content.

Applying the rules to the data packet can include applying a set of rules selected from network address translation, mobile internet protocol, virtual internet protocol, user authentication and URL blocking. Applying the rules to the data packet can include applying a set of policies selected from incoming policies and outgoing policies for a virtual local area network destination. Entries from one or more of a global address book, a private address book, and a global service book can be received and applying the rules to the data packet can include using the retrieved entries.

Available resources for outputting the data packet to the virtual private network destination can be determined, wherein the resources are definable by a user. Outputting the data packet can include outputting the data packet to a determined virtual private network destination in accordance with the determined available resources. Applying the rules to the data packet can include applying a set of virtual tunneling rules for a virtual local area network destination, whre the tunneling rules are selected from PPTP, L2TP and IPSec tunneling protocols. Outputting the data packet can include reading a set of entries in a private routing table and if a virtual local area network destination has been determined for the received data packet, outputting the data packet to its virtual local area network destination using a routing protocol for the packet's virtual local area network destination. A set of rules configured by a user can be received.

In general, in one aspect, this invention provides methods and apparatus, including computer program products, implementing and using techniques for screening data packets transferred over a network. A connection to one or more virtual local area networks is established. A set of firewall configuration settings are associated with each of the one or more virtual local area networks. An incoming data packet is received. The incoming data packet is screened in accordance with a set of firewall configuration settings and the screened data packet is output to a particular virtual local area network among the one or more virtual local area networks, based on the result of the screening.

In general, in one aspect, this invention provides methods and apparatus, including computer program products, implementing and using techniques for transferring packets of data. One or more packet processing engines can receive an incoming packet of data, apply a global traffic policy to the incoming packet, classify the incoming packet including determining a virtual local area network destination, shape the incoming packet based on the virtual local area network destination and output the shaped packet.

Advantageous implementations can include one or more of the following features. One or more switches can be connected to the packet processing engine by a trunk cable to receive the shaped packet from the packet processing engine through the trunk cable, determine a destination device to which the shaped packet is to be routed and switch the shaped packet to a communication link that is connected to the destination device. The trunk cable can be a VLAN cable. A first packet processing engine of the one or more packet processing engines can be connected to a first switch of the one or more switches, and cross connected to at least a second switch of the one or more switches and a second packet processing engine of the one or more packet processing engines can be connected to the second switch of the one or more switches and cross connected to at least the first switch of the one or more switches.

Each of the first and second switches can connect to one or more communication links, each communication link representing a virtual local area network destination. A trunk cable can connect a switch and a packet processing engine. One or more virtual local area networks (VLANs) can be connected to the one or more switches via a communication link dedicated for the virtual local area network. Outputting the packet can include outputting the shaped packet to its virtual local area network destination through a destination port on the packet processing engine, the destination port connecting the packet processing engine via a communication link to a destination device.

One or more virtual local area networks (VLANs) can be connected to a destination port on the packet processing engine via a communication link dedicated for the virtual local area network. Each packet processing engine can perform one or more functions that are configurable for each virtual local area network.

In general, in one aspect, this invention provides methods and apparatus, including computer program products, implementing and using techniques for providing a security system including security system resources including firewall services and a controller that can partition the security system resources into a plurality of separate security domains. Each security domain can be configurable to enforce one or more policies relating to a specific subsystem, and to allocate security system resources to the one or more security domains.

Advantageous implementations can include one or more of the following features. The security system can allocate security system resources to a specific subsystem. The specific subsystem can be a computer network. The specific subsystem can be a device connected to a computer network. Each security domain can include a user interface for viewing and modifying a set of policies relating to a specific subsystem. The security system resources can include authentication services. The security system resources can include virtual private network (VPN) services. The security system resources can include traffic management services. The security system resources can include encryption services. The security system resources can include one or more of administrative tools, logging, counting, alarming and notification facilities, and resources for setting up additional subsystems.

A management device can provide a service domain, the service domain being configurable to enforce one or more policies for all security domains. The management device can include a user interface for viewing, adding and modifying any set of policies associated with any specific subsystem and the set of policies associated with the service domain. The service domain can include a global address book. Each set of security domain policies can include one or more policies for incoming data packets, policies for outgoing packets, policies for virtual tunneling, authentication policies, traffic regulating policies and firewall policies. The policies for virtual tunneling can be selected from the group consisting of PPTP, L2TP and IPSec tunneling protocols. One or more of the security domains can include a unique address book.

The invention can be implemented to realize one or more of the following advantages. A single security device can be used to manage security for multiple customers, Each customer has their own unique security domain with an address book and policies for management of content. Each domain is separately administrated. One customer's policies do not interfere with the other customers' policies. Additionally, attacks on one customer's domain will not have any influence on the functionality of other domains. To each customer, the firewall and any virtual private networks (VPNs) appear to be hosted on a discrete device, just like the conventional systems. For an Internet data center that employs the Internet security system in accordance with the invention, a number of benefits may result. Instead of upgrading and managing one device for each customer, a single device can be upgraded and managed for several customers. Less rack space will be required, since fewer devices are necessary, and as a consequence, the wiring scheme will be less complicated. The cost of deployment will be lower, the network complexity and requirements will be reduced, and higher performance throughput will be possible.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

An Internet security system in accordance with the invention provides a multi-customer, multi-domain architecture that allows service providers, such as Internet data centers, application infrastructure providers and metropolitan area network providers to manage the security needs of multiple customers through one centralized system. The inventive Internet security system also allows service provider and end user customers to create and manage separate security domains, each domain acting as a stand alone system and having its own set of policies. The inventive Internet security system accomplishes this through unique architecture and software features that can be referred to as Virtual Systems. The Internet security system will be described by way of example. Three different exemplary architectures will be described with reference to FIGS. 2-4. After the architectural system description of each implementation, the data flow through the system will be described. Finally, the user interface and a number of customizable functions of the Internet security system will be presented.

Internet Security System Using Virtual Local Area Networks

Figure 1:
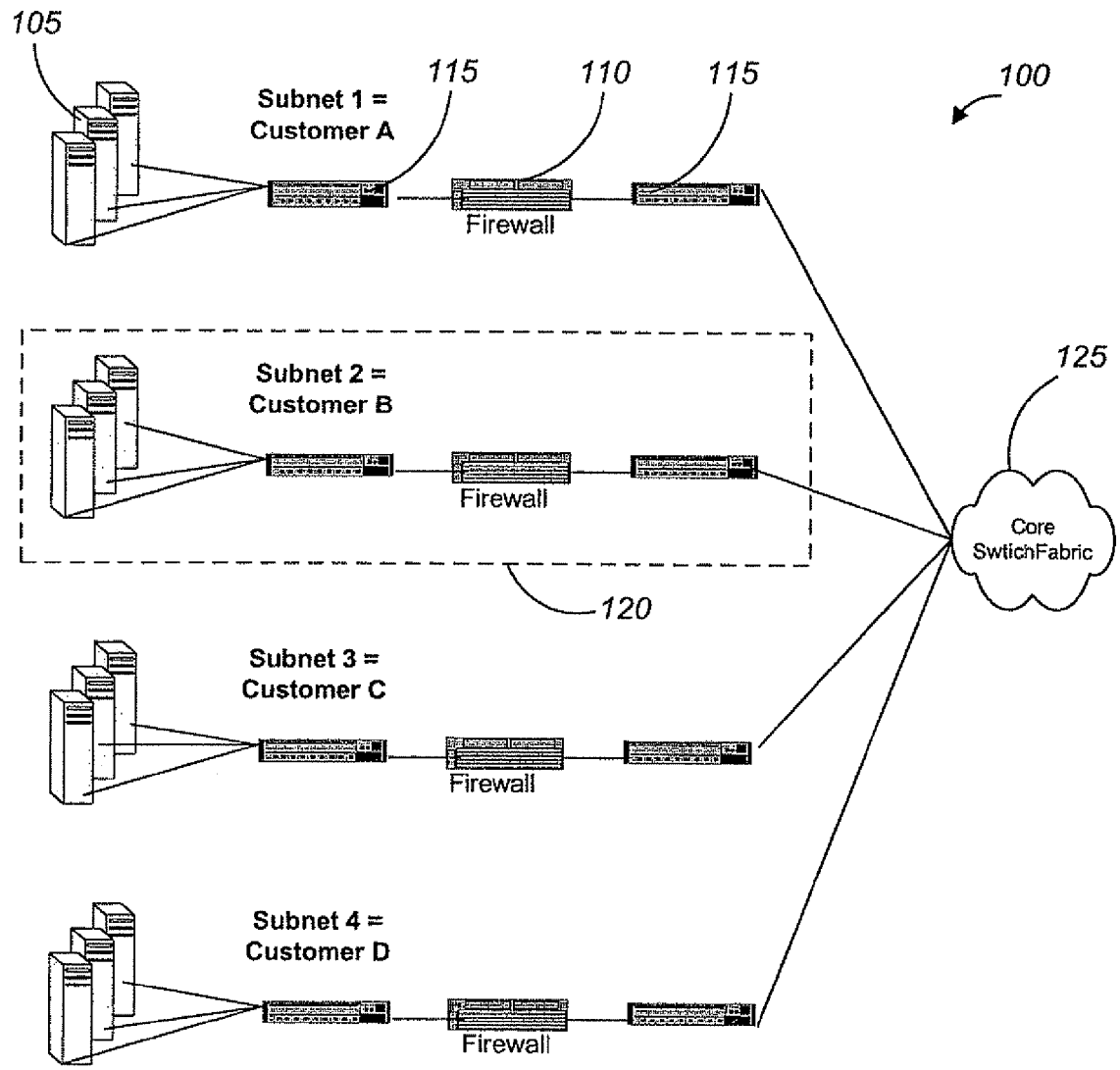
FIG. 1 is a schematic view of a prior art security system configuration for an Internet data center.
Figure 2:
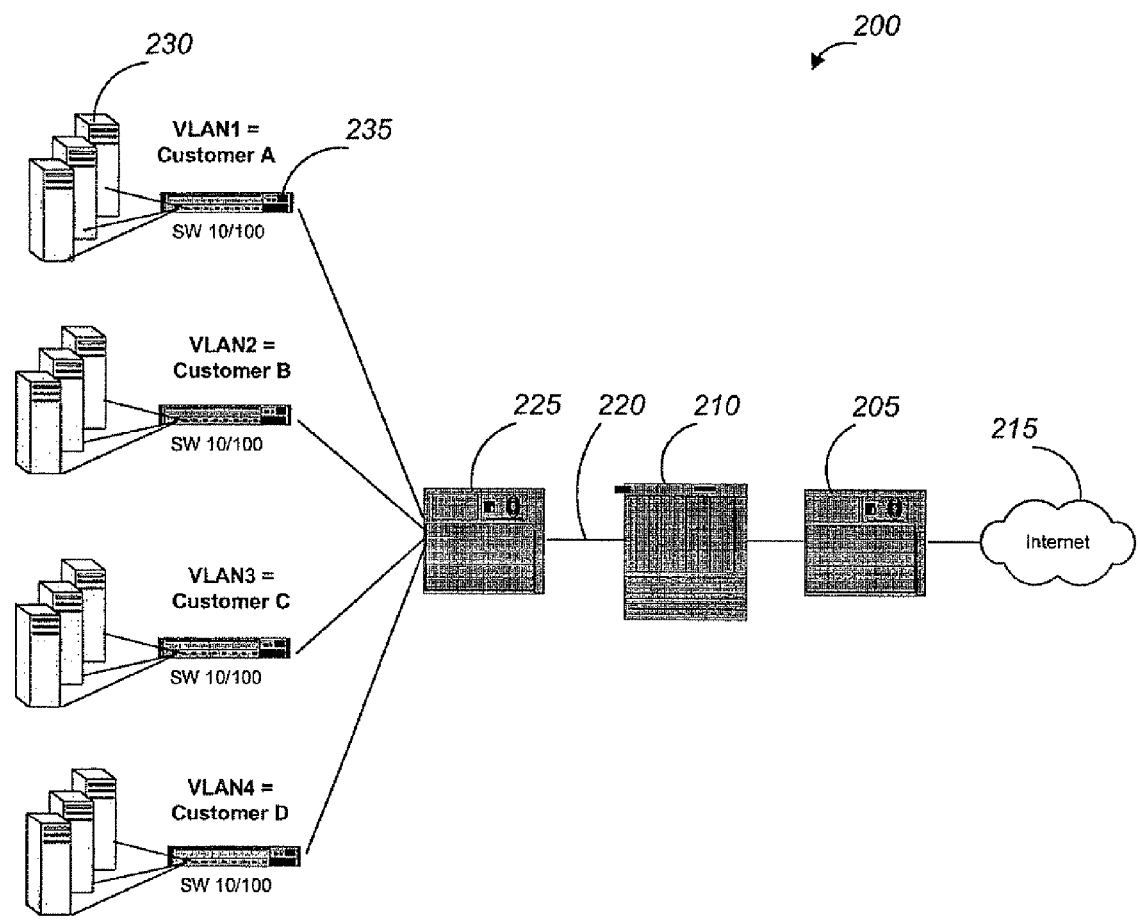
FIG. 2 is a schematic view of an Internet security system in accordance with the invention.

As shown in FIG. 2, the Internet security system (200) in accordance with one implementation of the invention includes a first $^{100}/_{1000}$ router switch (205) that connects a firewall device (210) to the Internet (215). The firewall device (210) acts as a common firewall for all the customers, and can be separately configured to fit each customer's policies and security needs. How the separate configurations are done will be explained in further detail below. On the secure side of the firewall device (210) is a Virtual Local Area Network (VLAN) trunk (220) that carries all packets to a second $^{100}/_{1000}$ switch (225). A VLAN is a Layer 2 multiplexing technique that allows several streams of data to share the same physical medium, such as a trunk cable, while enjoying total segregation. The second switch (225) directs the packets on private links to the different customers' servers (230) through a $^{10}/_{100}$ switch (235) for each customer.

An incoming data packet from the Internet (215) first passes the router switch (205) and enters the firewall device (210). The firewall device (210) determines what VLAN the packet is intended for and attaches a VLAN tag to the packet. In one implementation, the tag that is used is a 802.1Q tag. The 802.1Q VLAN tag requires 12 bits in the Ethernet packet header to hold the tag, and is defined in the 802.3ac Ethernet frame format standard ratified in 1998. The 802.3ac Ethernet frame format standard is supported by most backbone switches fabricated since the ratification of the standard. There are two ways to attach a tag to a data packet; implicit tagging and explicit tagging. The implicit tagging method assigns a tag to untagged data packets, typically based on which port the data packet came from. The implicit tagging method allows traffic coming from devices not supporting VLAN tagging to be implicitly mapped into different VLANs. The explicit tagging method requires that each data packet be tagged with the VLAN to which the data packet belongs. The explicit tagging method allows traffic coming from VLAN-aware devices to explicitly signal VLAN membership.

The packet then continues on VLAN trunk (220) to the VLAN switch (225), where the tag attached to the packet by the firewall device (210) is read. Based on the VLAN tag, the packet is routed by the VLAN switch (225) to the appropriate switch (235) and server (230). The operation of the firewall device (210) will be described in more detail below.

Internet Security System Using Port-Based Virtual Local Area Networks

Figure 3:
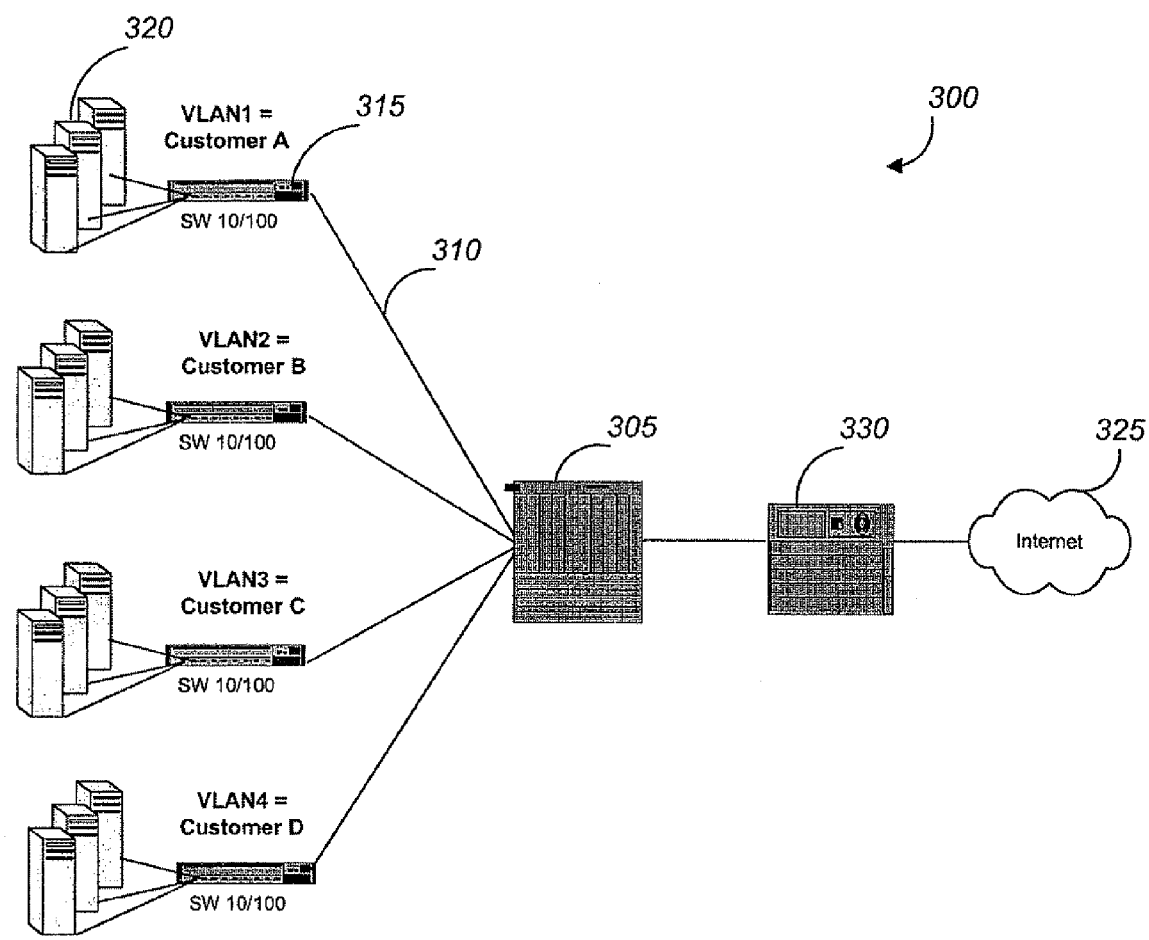
FIG. 3 is a schematic view of an Internet security system in accordance with an alternative implementation of the invention.

Another implementation of the invention is shown in FIG. 3, which shows essentially the same architecture as shown for the Internet security system in FIG. 2. The difference is that the firewall device (210) has been replaced with a firewall device (305) with port-based VLAN. From each port in the firewall with the port based VLAN, there is a private link (310) to each customer, switch (315) and server (320). The system (300) does not include the VLAN trunk or the second $^{100}/_{1000}$ switch of the Internet security system implementation shown in FIG. 2.

An incoming data packet from the Internet (325) first passes the router switch (330) and enters the firewall device (305). The firewall device (305) determines what system the packet is intended for. Instead of attaching a VLAN tag to the packet, the firewall device directs the packet to the proper dedicated port for the VLAN. The packet then continues on the selected private link (310) to the switch (315) and server (320) for the selected VLAN.

Figure 9:
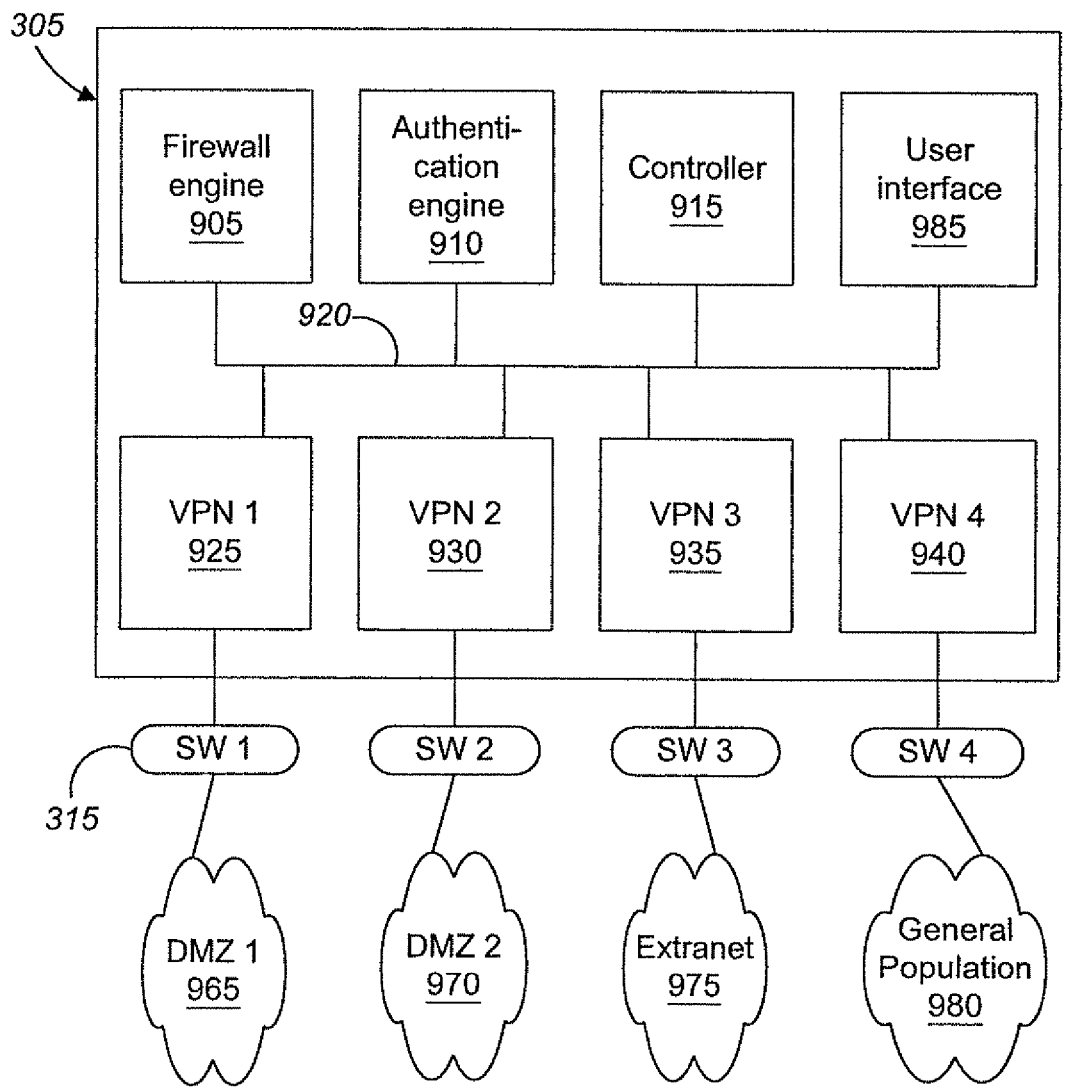
FIG. 9 is a schematic block diagram showing a more detailed view of the security device in FIG. 3.

FIG. 9 shows a more detailed view of the Internet security system of FIG. 3, and in particular of the firewall device (305). The firewall device (305) includes functionality not conventionally included in a firewall and can therefore be referred to more generally as a security system or a data processing system. The security system has a number of engines, such as a firewall engine (905), an authentication engine (910), and optionally other engines. A user interface (985) is also provided in the security system, which allows a user to set different policies for the different engines. The different engines communicate with each other through a bus (920). A user can set firewall policies for the firewall, such as incoming policies and outgoing policies for a virtual local area network destination, and authentication policies for the authentication engine, such as network address translation, mobile Internet protocol, virtual Internet protocol, user authentication and URL blocking.

When a packet comes in, a controller (915) detects the packet. The controller is connected to the bus (920) and can communicate with the engines. Also connected to the bus (920) is a set of virtual private networks (925-940), that each are connected to a network, optionally through one or more switches (315). The exemplary networks shown in FIG. 9 include two DMZs (Demilitarized Zones) (965, 970), an extranet (975) and a general population net (980). Each of the virtual private networks (VPNs), has an associated destination address and policies. After the packet has been detected by the controller (915), the controller (915) examines the data packet for a virtual private network destination address and identifies the policies that are associated with the virtual private network destination. If the policies include firewall policies, the controller (915) calls the firewall engine (905), which applies the set of firewall policies corresponding to the virtual private network destination to the data packet. If the policies include authentication policies, the controller (915) calls the authentication engine (910), which applies the set of authentication policies corresponding to the virtual private network destination to the data packet. After the respective engine has applied the policies, the data packet is routed to the virtual private network corresponding to the data packet's destination address. How the incoming data packet is examined will be described in greater detail below.

The security system as a whole thus has a finite amount of security system resources, including firewall and authentication services. The controller partitions the security system resources into a number of separate security domains, each security domain being related to a private or public network. Each security domain is configurable to enforce one or more policies relating to a specific subsystem or network. The controller allocates security system resources to the one or more security domains based on the needs of the respective security domain, by calling the different engines, as described above. Instead of the static resource allocation in conventional Internet security systems with one security device or firewall per client, as was described in the background section above, the inventive Internet security system provides dynamic resource allocation on a as needed basis for the different virtual private networks and associated systems.

The security system resources can include a wide range of resources, such as authentication services, virtual private network (VPN) services, include traffic management services, encryption services, administrative tools, logging, counting, alarming and notification facilities, and resources for setting up additional subsystems.

Figure 4:
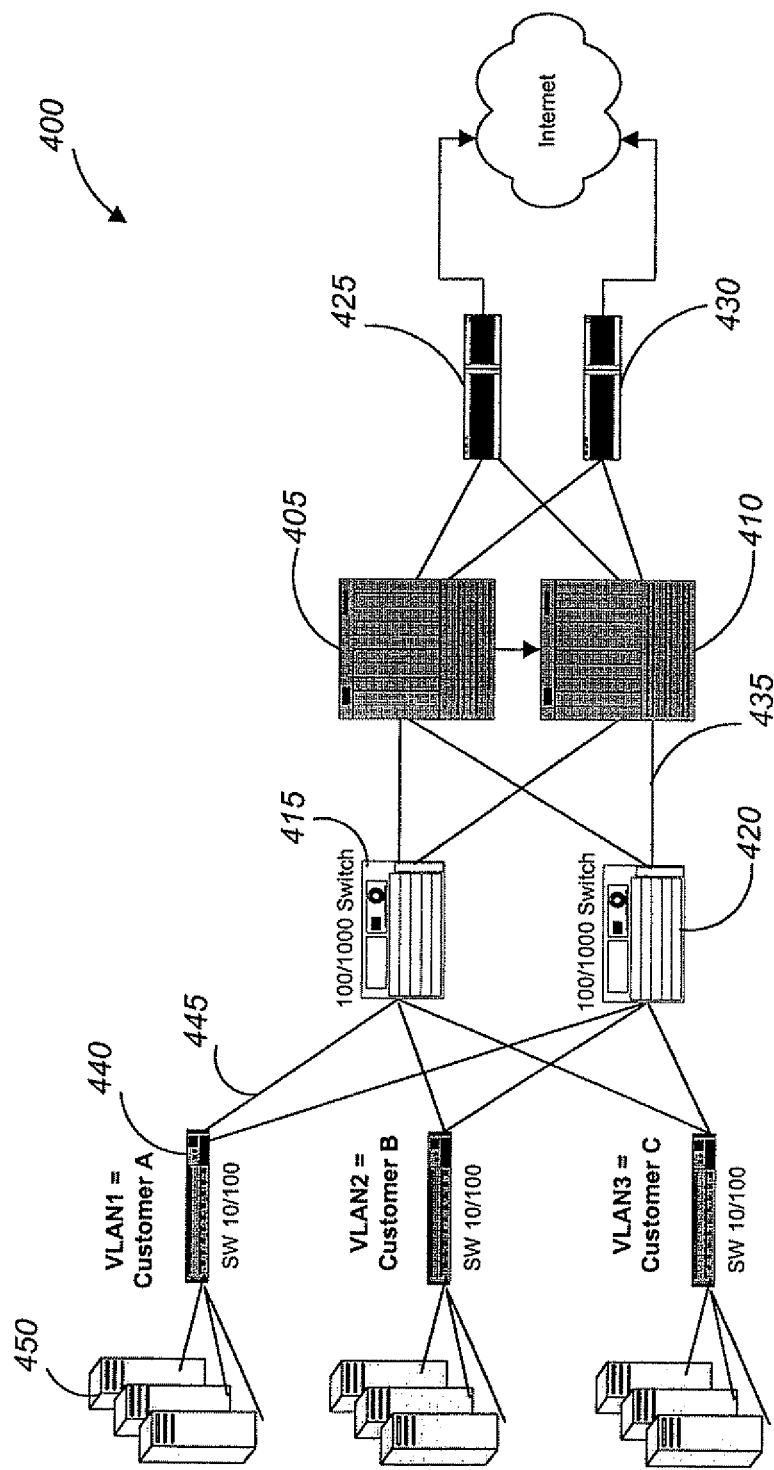
FIG. 4 is a schematic view of an Internet security system in accordance with another alternative implementation of the invention.

Internet Security System Using Virtual Local Area Networks with High Availability Yet another implementation of the invention is shown in FIG. 4, which shows an Internet security system architecture (400) similar to that shown in FIG. 2. However, in order to provide the ability to accommodate more traffic and to provide higher availability in the event of equipment failure, the system provides dual firewalls (405, 410) and dual second switches (415, 420). The first switches have been replaced with switch/routers (425, 430) that can direct incoming traffic to either firewall (405, 410). Each firewall is connected to both second switches (415, 420) through VLAN trunks (435), and each of the second switches is connected to all the customer switches (440) by private links (445). The cross connection scheme ensures that an alternate route for data packages will be available, even in the event of component failure, and a high availability is thereby ensured.

An incoming data packet from the Internet arrives at one of the router switches (425, 430). The router switch decides what firewall device (405, 410) to send the packet to, based on which firewall device currently has most available capacity and sends the packet to that firewall device. Just like the above-described implementation shown in FIG. 2, the firewall device (405, 410) determines what VLAN the packet is intended for, and attaches a VLAN tag to the packet. The packet then continues on VLAN trunk (435) to the VLAN switch (415, 420) with the most available capacity, where the tag attached to the packet by the firewall device (405, 410) is read. Based on the VLAN tag, the packet is routed by the VLAN switch (415, 420) through a private link (445) to the appropriate switch (440) and server (450).

Packet Classification and Context Partition

Figure 5:
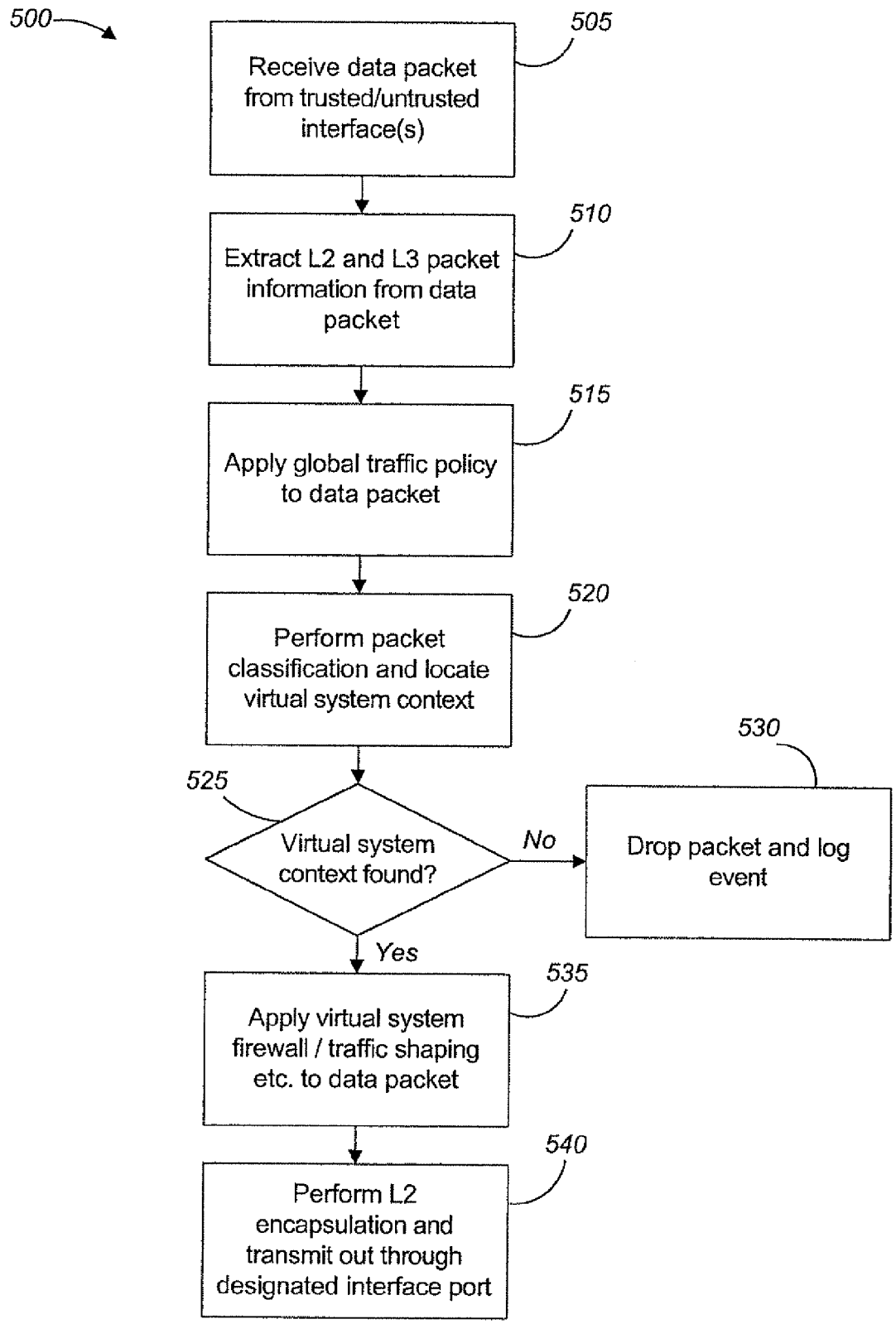
FIG. 5 is a flowchart showing a data packet processing method in accordance with the invention.

The following example describes a process for classifying and sending out an incoming packet to the appropriate virtual system using the firewall device in the Internet security system in accordance with the invention. As shown in FIG. 5, a process (500) for classifying and sending out an incoming data packet begins with receiving a data packet (505). In the present example, the data packet is assumed to come from a trusted host. Data packets that are received from an untrusted host will be treated somewhat differently, which will be described below.

Once the data packet has been received, the layer 2 (L2) information and the layer 3 (L3) information is extracted from the packet (510). The L2 information includes: Interface Number and VLAN ID. The L3 information includes IP head or information.

After the L2 and L3 information has been extracted, one or more global traffic policies are applied to the packet (515). The global traffic policies apply to all virtual system domains in the Internet security system.

When the global traffic policies have been applied, the packet goes through a classification (520) to find a Virtual System Context. The virtual system context is an object containing all the configuration parameters for the virtual system to which the packet is destined. The packet classification is based a combination of the interface, VLAN ID and/or L3/L4 (that is, TCP/UDP port) information. In a simple configuration, Interface and VLAN ID will be sufficient, while in a more complicated configuration, all the information listed above is necessary to locate the right context. The packet classification step is essential for the method and will be described in further detail below after the overall data packet processing procedure has been described.

The procedure then checks if a virtual system context has been found (525). If no virtual system context can be found, the packet is dropped and the event is logged (530). If a virtual system context has been found, the packet will be subjected to firewall/VPN/traffic shaping processing (535), in the same way as the packet would be processed on a stand-alone device. After the firewall/VPN/traffic shaping processing the procedure transforms the packet into an egress packet, and the L2 information is encapsulated (540) before the packet is transmitted out through a designated interface port to the proper Virtual private network, which completes the procedure.

If the incoming packet comes from an untrusted interface, the processing is somewhat different than when the packet originates at a trusted interface. The different processing is necessary because an untrusted interface may be shared among several virtual systems. Therefore, the packet classification step (520) will, optionally, use more information, such as tunnel identifications for protocols such as IPSEC, L2TP. When a tunnel has been identified, the virtual system context can be identified, and the packet can pass to the Firewall/VPN/Traffic shaping step (535).

For non-tunnel traffic, a policy-based and session-based look-up table may be used to identify a virtual system context for the traffic from an untrusted interface. In the packet classification step (520), the packet will be subject to a global policy in order to identify if there is a session anywhere in the whole security system that matches with the packet. If such a session exists, the context point in the session record informs the security system about which virtual system context is the correct one. If there is no session match, but there is a policy that matches the packet, then that policy will point to the proper virtual system context for continued processing.

The classification step (520) described above determines to which virtual system the incoming data packet is destined. The classification step (520) will now be described in more detail with reference to FIGS. 6-8 that show in greater what happens to the data packet during the classification. Conceptually, the Internet security system in accordance with the invention can be viewed as processes in an operating system, the primary difference being that processes in an operating system are event driven, while the Internet security system is packet driven. When the Internet security system receives an incoming data packet, the system needs to classify the packet based on information contained in the packet and on the policies that have been configured for the system. When the packet has been classified, the virtual system context to which the packet belongs is found, and the packet is passed to the associated virtual system context for further processing. From the point of view of the virtual system, the packet appears to have originated in one of the virtual interfaces configured for the virtual system.

Figure 6:
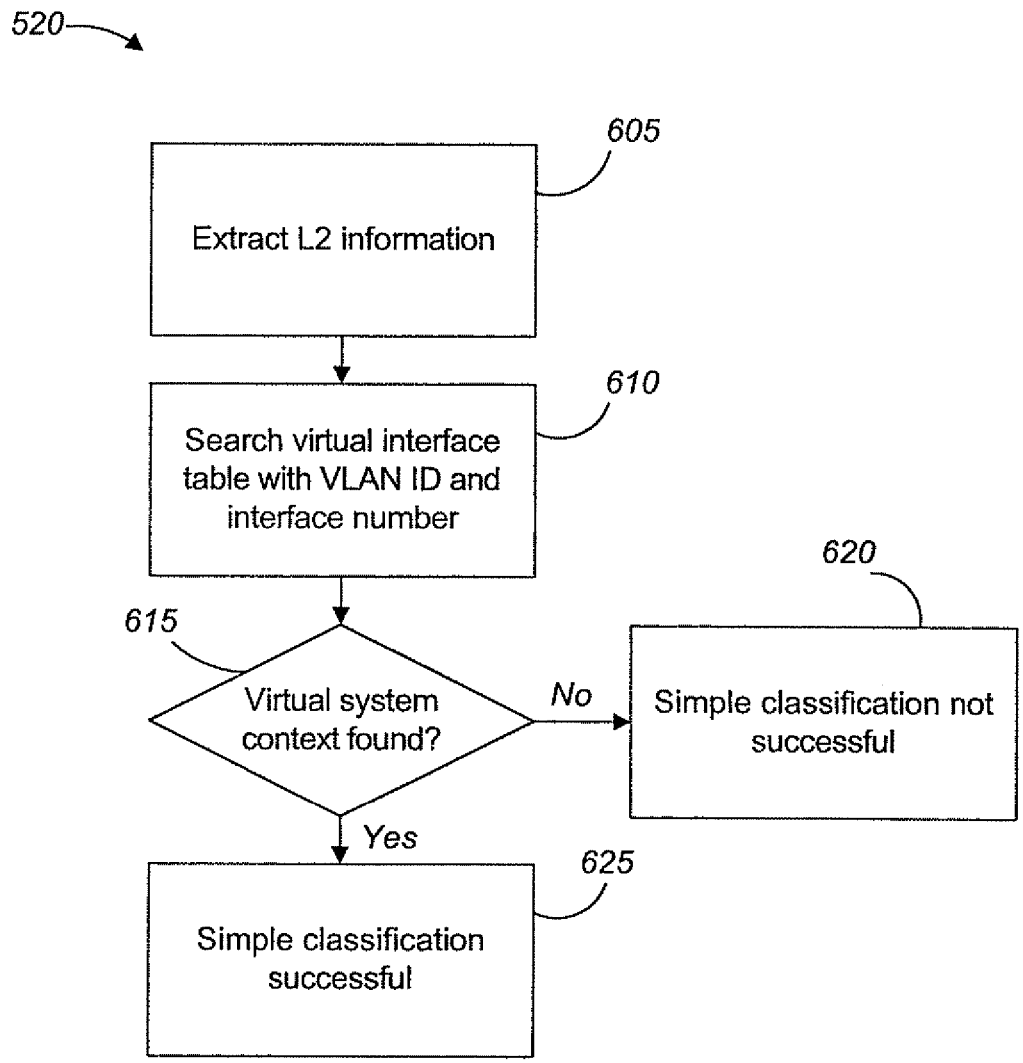
FIG. 6 is a flowchart detailing one implementation of the packet classification step in FIG. 5.

The classification of the incoming packet is made based on information from layer 2 (L2), layer 3 (L3), layer 4 (L4) and layer 7 (L7) information. The classification may be made based on one or more layers. For example, in a simple configuration, a virtual system using VLAN to separate different secure domains, the VLAN ID in the VLAN Ethernet packet is sufficient to classify the packet and identify the destination virtual system context. This is referred to as simple classification. An exemplary process for simple classification is shown in FIG. 6, where the L2 information is extracted (605), the virtual interface table is searched with the VLAN ID and the interface number (610). Based on the VLAN ID and the interface number, the process can determine whether a virtual system context has been found (615). If no virtual system context can be found, then the simple classification is not sufficient (620), and if a virtual system context can be found, then the simple classification is sufficient (625).

Figure 7:
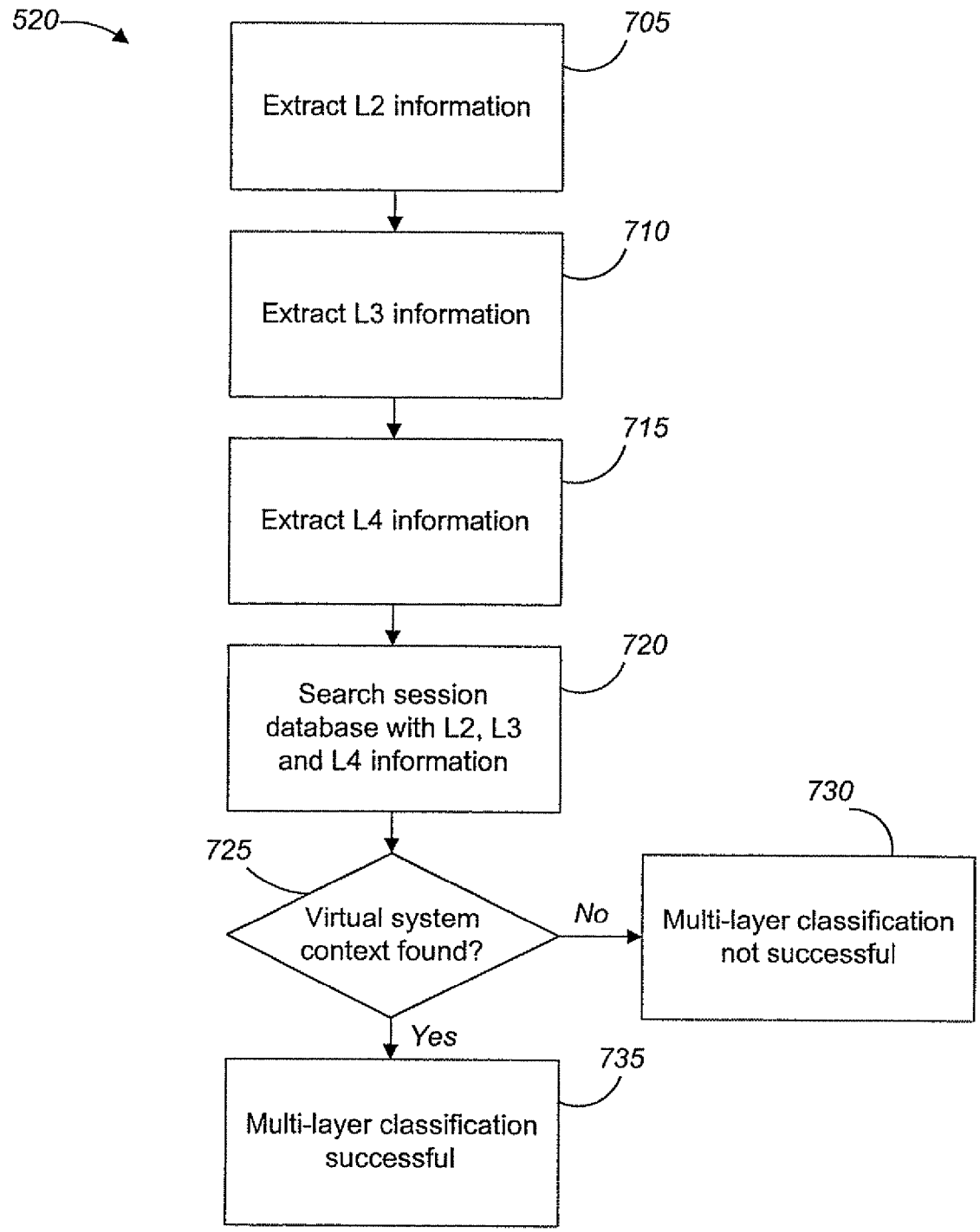
FIG. 7 is a flowchart detailing one implementation of the packet classification step in FIG. 5.

In an Internet security system with shared outside identity, a session database is used along with L2, L3 and L4 information to identify the correct virtual system. This is referred to as multi-layer classification. A process for multi-layer classification is shown in FIG. 7, where the L2 information (705), the L3 information (710) and the L4 information is extracted (715), before the session database is searched (720). Based on the L2, L3 and L4 information and the information in the session database, the process can determine whether a virtual system context has been found (725). If no virtual system context can be found, then the multi-layer classification is not sufficient (730), and if a virtual system context can be found, then the multi-layer classification is sufficient (735).

Figure 8:
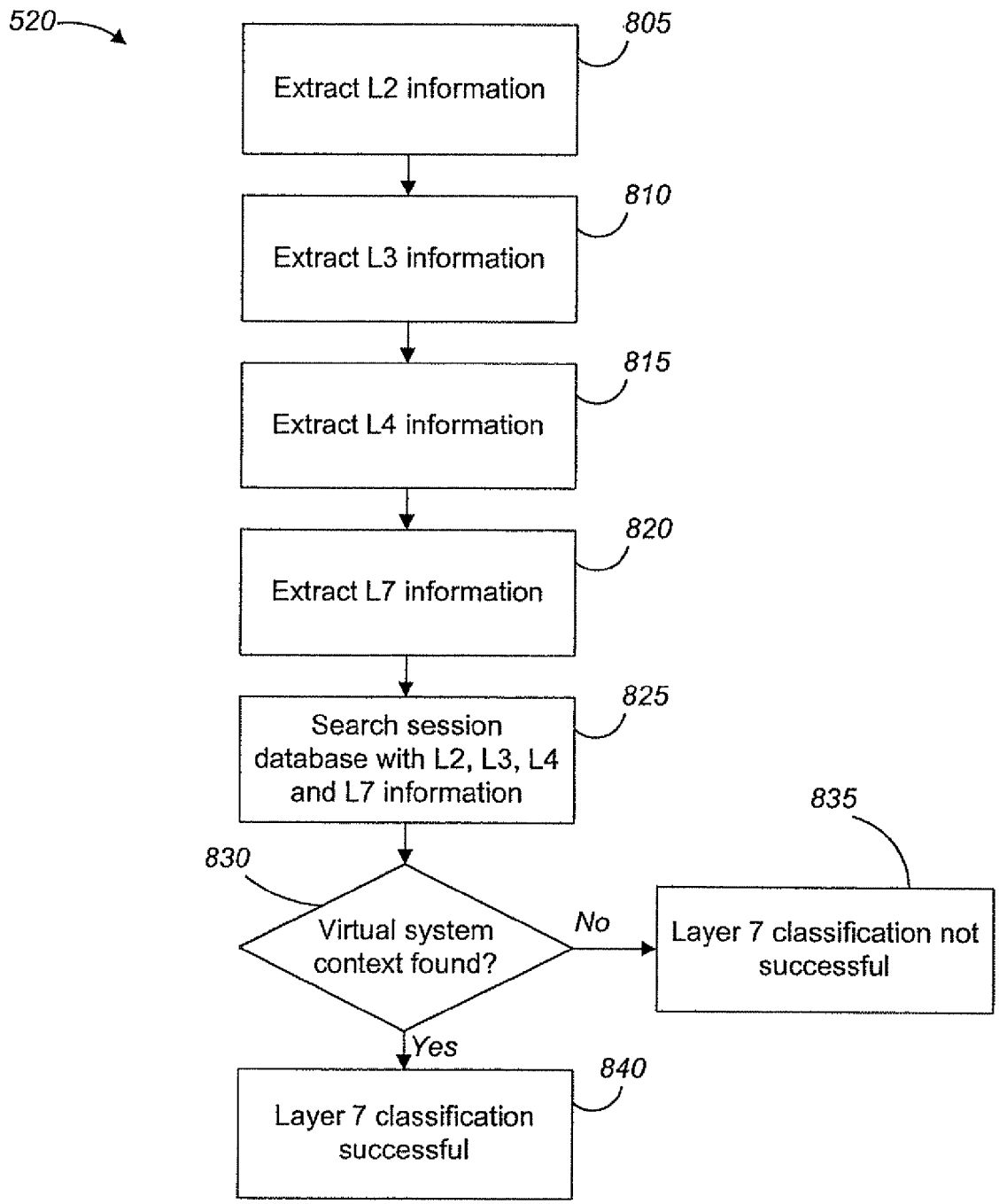
FIG. 8 is a flowchart detailing a alternative implementation of the packet classification step in FIG. 5.

When complicated applications with dynamic port session (such as, FTP, RPC, H.323, and so on) are involved, a dynamic session database, along with L2, L3, L4, and L7 (application layer) information are used to identify the virtual system context. This is referred to as L7 classification. A process for L7 classification is shown in FIG. 8, where the L2 (805), the L3 (810), the L4 (815) and the L7 information is extracted (820) before the dynamic session database is searched (825). Based on the L2, L3, L4, and L7 information and the dynamic session database, the process can determine whether a virtual system context has been found (830). If no virtual system context can be found, then the simple classification is not sufficient (835), and if a virtual system context can be found, then the simple classification is sufficient (840). Each of the simple, multi-layer or L7 classification can be performed by itself, or the processes can be performed in series, going from the simple classification, through the multi-layer classification to the L7 classification until the packet has been classified and a virtual system context has been identified.

The virtual systems are created through configuration of the Internet security system in real time or at start up with a saved configuration script. A system administrator creates virtual system context under a root privilege, and assigns certain attributes to the context. The system resources are now partitioned to support the new virtual system. A virtual system user can then log in to the system and will only see his or her virtual system, as if the user owned the whole system. A virtual system owner then can add, change and remove different attributes on the context. Once submitted, all attributes will be saved as configuration data for the Internet security system and be used to partition resources, change the global classification policy, and so on. How the Internet security system and individual virtual systems can be configured will be discussed in further detail below.

Configuring an Internet Security System

The description will now continue with an example showing how to configure an Internet security system in accordance with the invention, and showing three different examples of the user interfaces: one for a root level configuration, one where a root user creates a virtual system and adds configuration data, and one where a virtual system user logs in to a virtual system and changes configuration data.

First, a root user (that is, a system administrator for the whole Internet security system) with the user name "Netscreen" logs in to the system by entering the username and a password:

login: Netscreen
  password:
  ns1000->

The root user is now logged on and can access the root level interface configuration to view the different user interfaces that are present on the system. The command 'get interface,' for example, yields the following five interfaces, shown in Table 1 below.

TABLE 1

| | | User interfaces present on the Internet Security System | | | |
|---|---|---|---|---|---|
| Name | Stat | IP Address | Subnet Mask | MAC/VLAN/VSYS | Manage IP |
| Trust | Down | 10.1.1.250 | 255.255.255.0 | 0010.dbf.1000 | 0.0.0.0 |
| Trust/1 | Down | 11.1.1.250 | 255.255.255.0 | Nat/trust.100(100)/NULL | 0.0.0.0 |
| Untrust | Down | 192.1.1.250 | 255.255.255.0 | 0010.dbf0.1001 | |
| Mgt | Up | 0.0.0.0 | 0.0.0.0 | 0010.dbf0.1002 | 192.168.1.1 |
| Ha | Down | 0.0.0.0 | 0.0.0.0 | 0010.dbf0.1004 | 192.168.1.1 |

The root user can view the root level address entry configuration with the command 'get address' which yields the trusted, untrusted, and virtual addresses shown in Table 2 below:

TABLE 2

Trusted, Untrusted, and Virtual Addresses

| Name | Address | Netmask | Flag | Comments |
|---|---|---|---|---|
| Trusted Individual Addresses: | | | | |
| Inside Any | 0.0.0.0 | 0.0.0.0 | 02 | All trusted addr. |
| T11net | 11.1.1.0 | 255.255.255.0 | 00 | |
| Untrusted Individual addresses: | | | | |
| Outside Any | 0.0.0.0 | 0.0.0.0 | 03 | All Untrusted Addr |
| Dial-Up VPN | 255.255.255.255 | 255.255.255.255 | 03 | Dial-Up VPN Addr |
| u-199net | 199.1.1.0 | 255.255.255.0 | 01 | |
| Virtual Individual Addresses: | | | | |
| All Virtual Ips | 0.0.0.0 | 0.0.0.0 | 12 | All Virtual Addr |

The root user can view the Virtual Private Network configuration by typing the command 'get vpn' which yields the virtual private network configuration in Table 3 below. Here, there is only one VPN setting for the system.

TABLE 3

VPN systems for the Internet Security System

| Name | Gateway | Local SPI | Remote SPI | Algorithm | Monitor |
|---|---|---|---|---|---|
| m-t11-u199 | 192.2.1.250 | 00001234 | 00004321 | Esp:3des/null | Off |

Total manual VPN: 1

To view the access policy configuration, the root user types the command 'get policy' which yields the three policies shown in Table 4 below for the root system.

TABLE 4

Policies for the root system in the Internet Security System

| PID | Direction | Source | Destination | Service | Action | STLC |
|---|---|---|---|---|---|---|
| 0 | Outgoing | T-11net | u-199net | Any | Tunnel | — |
| 1 | Incoming | U-199net | t-11net | Any | Tunnel | — |
| 2 | Inside | Any | Outside | Any | Permit | — |

The description will now continue with explaining how the root user can create a new virtual system named "marketing" and configure that system. The root user first adds the virtual system "marketing" to the Internet security system.

ns1000-> set vsys marketing

The root user then adds configuration data to the newly created system "marketing" by first adding two virtual interfaces for the "marketing" system. Note how the prompt has changed to indicate that the root user is working in the "marketing" system.

ns1000(marketing)-> set interface trust/200 ip 20.1.1.250 255.255.255.0 tag 200 ns1000(marketing)-> set interface untrust/200 ip 193.1.1.250 255.255.255.0 tag 200

The next configuration to update is to add a virtual system private address entry to the "marketing" system.

ns1000(marketing)-> set address trust t-20net 20.1.1.64 255.255.255.128

The root user then adds a MIP attribute to the private virtual interface, as well as two incoming/outgoing policies.

ns1000(marketing)-> set interface untrust/200 mip 193.1.1.241 host 20.1.1.40 ns1000(marketing)-> set policy incoming out-any mip (193.1.1.241) http permit ns1000(marketing)-> set policy outgoing t-20net out-any any permit auth Next, the root user can verify the interface configuration settings by typing the command 'get interface'. As shown above, the 'get interface' command yields the virtual interfaces for the current system. Since the current system is the "marketing" system, the root user will only see two virtual interfaces crated above, as shown in Table 5 below.

TABLE 5

Virtual interfaces for the "marketing" virtual system

| Name | Stat | IP Address | Subnet Mask | MAC/VLAN/VSYS | Manage IP |
|---|---|---|---|---|---|
| Trust/200 | Down | 20.1.1.250 | 255.255.255.0 | Nat/trust.200(200)/marketing | |
| Trust/200 | Down | 193.1.1.250 | 255.255.255.0 | Route/untrust.200(200)/marketing | |

As described above, the root user can see the virtual system address configuration for the "marketing" system by typing the command 'get address,' which yields the address entries shown in Table 6 below.

TABLE 6

Address entries for the "marketing" system

| Name | Address | Netmask | Flag | Comments |
|---|---|---|---|---|
| Trusted Individual Addresses: | | | | |
| Inside Any | 0.0.0.0 | 0.0.0.0 | 02 | All trusted addresses |
| T-20net | 20.1.1.64 | 255.255.255.128 | 00 | |
| Untrusted Individual addresses: | | | | |
| Outside Any | 0.0.0.0 | 0.0.0.0 | 03 | All Untrusted Addresses |
| Dial-Up VPN | 255.255.255.255 | 255.255.255.255 | 03 | Dial-Up VPN Addresses |
| Virtual Individual Addresses: | | | | |
| All Virtual Ips | 0.0.0.0 | 0.0.0.0 | 12 | All Virtual Addresses |
| MIP | 193.1.1.241 | 255.255.255.255 | 10 | Untrust/200 |

The user can now retrieve the policies for the "marketing" system by typing the command 'get policy' at the prompt. The get policy command yields the following two policies for the "marketing" system, shown in Table 7 below.

TABLE 7

Policies for the "marketing" system

| PID | Direction | Source | Destination | Service | Action | STLC |
|---|---|---|---|---|---|---|
| 0 | Incoming | Outside Any | MIP (193.1.1.124) | HTTP | Permit | — |
| 1 | Outgoing | t-20net | Outside Any | Any | Permit-Auth | — |

The configuration file for the "marketing" system virtual system can be obtained by typing 'get config' which yields:
  Total Config size 1503:
  set vsys "marketing"
  set vsys-id 1
  set auth type 0
  set auth timeout 10
  set admin name "vsys_marketing"
  set admin password nIxrDlr7BzZBcq/LyshENtLt9sLGFn
  set interface trust/200 ip 20.1.1.250 255.255.255.0 tag 200
  set interface untrust/200 ip 193.1.1.250 255.255.255.0 tag 200
  set interface untrust/200 mip 193.1.1.241 host 20.1.1.40 netmask 255.255.255.255
  set address trust "t-20net" 20.1.1.64 255.255.255.128
  set policy id 0 incoming "Outside Any" "MIP (193.1.1.241)" "HTTP" Permit
  set policy id 1 outgoing "t-20net" "Outside Any" "ANY" Permit Auth
  exit The root user has now created a virtual system, configured the system, and verified that all the settings are correct. He or she then exits the marketing system, saves the new configuration and the prompt returns to the root level.
  ns1000(marketing)-> exit
  Configuration modified, save? [y]/n y
  Save System Configuration . . . Done
  ns1000>

The current Internet security system settings can now be viewed by the root user by typing 'get vsys', which yields the settings shown in Table 8 below. As can be seen the Internet security system now has a marketing system and a sales system. The marketing system has one sub-interface, while the sales system has a trusted and an untrusted interface.

TABLE 8

Internet security system settings

| Name | ID | Sub-interface | VLAN | IP/Netmask |
|---|---|---|---|---|
| Marketing | 1 | Trust/200 | Trust.200 | 20.1.1.250/ 255.255.255.0 |
| Sales | 2 | Trust/300 | Trust.300 | 30.1.1.250/ 255.255.255.0 |
|  |  | Untrust/200 | Untrust.200 | 193.1.1.250/ 255.255.255.0 |

The description will now continue with showing what a user of a virtual system, a "marketing" system, sees and the operations he or she can perform when he logs in to the system. The user logs in with his username and password:
  login: vsys_marketing
  password:
  ns1000(marketing)->
To change the policy configuration, the user types 'get policy' which yields the two policies shown in Table 7 above.

Now, the user can remove the first policy with the command 'unset policy 1' and add a new policy to the "marketing" system by typing
  ns1000(marketing)-> set policy outgoing in-any out-any any permit auth
The new policy configuration can be shown by retyping the 'get policy' command, which yields the policies shown in Table 9 below.

TABLE 9

Modified policies for the "marketing" system

| PID | Direction | Source | Destination | Service | Action | STLC |
|---|---|---|---|---|---|---|
| 0 | Incoming | Outside Any | MIP (193.1.1.124) | HTTP | Permit | — |
| 2 | Outgoing | Inside Any | Outside Any | Any | Permit-Auth | — |

The user can then exit the "marketing" system and save the modified policies in the same way as the root user exited:
  ns1000(marketing)-> exit
  Configuration modified, save? [y]/n y
  Save System Configuration . . . Done The above examples only showed how to change a few policies and components. In the Internet security system in accordance with the invention, the following components can be independently configured in a similar way to the above example:

Firewall—The firewall device can be configured for each user to include one or more of the following mechanisms: NAT (Network Address Translation), MIP/VIP (Mapped IP, Virtual IP), User authentication, URL Blocking.

Policy—A private policy set can be configured that is applied to traffic for a particular customer. The private policy can include both incoming and outgoing policies. The policies can use entries from a global address book, a defined private address book, and a global service book.

Traffic management—Each virtual interface can be given a specific bandwidth.

Administration and management—Various functions can be configured for administration purposes, such as administrator login, mail alert, syslog, counters, logs and alarms.

Virtual LAN—The Virtual LAN can be defined on virtual interfaces within the Internet security system. Once the virtual LAN has been defined, the received VLAN traffic will be directed to the indicated virtual interface and traffic destined to the indicated virtual interface will be properly tagged with a VLAN ID.

VPN—Combined with private policies, the VPN provides secure tunneling for selected traffic going through the Internet security system. The tunneling can be PPTP, L2TP and IPSec.

Routing—Each system may define a private routing table and routing protocol.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
  a device comprising:
    a firewall to:
      receive a plurality of sets of firewall policies,
        each set of firewall policies, of the plurality of sets of firewall policies, being associated with a different virtual private network of a plurality of virtual private networks; and a controller to:
  receive a data packet;
  obtain, from the data packet, layer information that includes layer 2 information, layer 3 information, layer 4 information, and layer 7 information;
  search, using the layer 2 information without using the layer 7 information, a data structure to determine whether the data structure stores information regarding configuration data of a particular virtual private network of the plurality of virtual private networks,
    the data packet being destined for the particular virtual private network,
    the data structure storing information regarding configuration data of one or more virtual private networks of the plurality of virtual private networks;
  when the data structure does not store the information regarding the configuration data of the particular virtual private network:
    search another data structure to determine whether the other data structure stores the information regarding the configuration data of the particular virtual private network,
      the other data structure being searched using the layer information that includes the layer 2 information, the layer 3 information, the layer 4 information, and the layer 7 information;
    drop the data packet when the data structure and the other data structure do not store the information regarding the configuration data of the particular virtual private network;
  identify policies included in the configuration data of the particular virtual private network when the data structure or the other data structure stores the information regarding the configuration data of the particular virtual private network;
  determine that the policies include a set of firewall policies, of the plurality of sets of firewall policies, associated with the particular virtual private network;
  cause the firewall to apply, to the data packet, the set of firewall policies associated with the particular virtual private network based on determining that the policies, associated with the particular virtual private network, include the set of firewall policies; and
  cause the data packet to be routed toward the particular virtual private network after the set of firewall policies has been applied to the data packet.

2. The system of claim 1, where the device further comprises an element to receive a set of authentication policies,
  where the controller is further to cause the element to apply, to the data packet, one or more authentication policies, from the set of authentication policies, corresponding to the particular virtual private network, when the policies associated with the particular virtual private network include the one or more authentication policies, and
  where the one or more authentication policies include one or more of: network address translation, a policy associated with mobile Internet protocol, or user authentication.

3. The system of claim 1, where the set of firewall policies include one or more of incoming policies or outgoing policies for the particular virtual private network.

4. A method performed by a device, the method comprising:
  associating, by the device, a set of firewall configuration settings with each of a plurality of virtual local area networks;
  receiving, by the device, a data packet;
  obtaining, by the device, layer information from the data packet,
    the layer information including layer 2 information, layer 3 information, layer 4 information, and layer 7 information;
  searching, by the device and using the 2 layer information without using the layer 7 information, a data structure to determine whether the data structure stores information regarding configuration data of a particular virtual local area network of the plurality of virtual local area networks,
    the data packet being destined for the particular virtual local area network,
    the data structure storing information regarding configuration data of one or more virtual local area networks of the plurality of virtual local area networks;
  when the data structure does not store the information regarding the configuration data of the particular virtual local area network:
    searching, by the device, another data structure to determine whether the other data structure stores the information regarding the configuration data of the particular virtual local area network of the plurality of virtual local area networks,
      the other data structure being searched using the layer information including the layer 2 information, the layer 3 information, the layer 4 information, and the layer 7 information;
  dropping, by the device, the data packet when the data structure and the other data structure do not store the information regarding the configuration data of the particular virtual local area network;
  identifying, by the device, information included in the configuration data of the particular virtual local area network when the data structure or the other data structure stores the information regarding the configuration data of the particular virtual local area network;
  determining, by the device, that the configuration data of the particular virtual local area network includes the set of firewall configuration settings associated with the particular virtual local area network;
  processing, by the device, the data packet based on the set of firewall configuration settings, associated with the particular virtual local area network, after determining that the configuration data of the particular virtual local area network includes the set of firewall configuration settings associated with the particular virtual local area network; and
  outputting, by the device, the data packet toward the particular virtual local area network after processing the data packet based on the set of firewall configuration settings.

5. The method of claim 4, further comprising:
  applying a traffic policy to the data packet,
    the traffic policy being applied to all data packets processed by the device.

6. The method of claim 4, further comprising:
  applying authentication policies that include one or more of:
    network address translation,
    a policy associated with mobile Internet protocol, a policy associated with virtual Internet protocol, or user authentication.

7. The method of claim 4, where the set of firewall configuration settings, associated with the particular virtual local area network, include incoming policies and outgoing policies for a virtual local area network destination associated with the particular virtual local area network.

8. The method of claim 4, further comprising:
determining available resources for outputting the data packet to the particular virtual local area network,
the resources being definable by a user; and
where outputting the data packet comprises:
outputting the data packet toward the particular virtual local area network based on the determined available resources.

9. The method of claim 4, where outputting the data packet comprises:
reading a set of entries in a routing table; and
outputting the data packet to a virtual local area network destination, associated with the particular virtual local area network, using a routing protocol for the virtual local area network destination,
the set of entries, in the routing table, being associated with the virtual local area network destination.

10. A system, comprising:
a device to:
obtain, from a data packet, layer information that includes:
layer 2 information,
layer 3 information,
layer 4 information, and
layer 7 information;
search, using the layer information, a first data structure or a second data structure to determine whether the first data structure or the second data structure stores information regarding configuration data of a particular virtual private network of a plurality of virtual private networks,
the data packet being destined for the particular virtual private network,
the first data structure or the second data structure storing information regarding configuration data of one or more virtual private networks of the plurality of virtual private networks,
when searching the first data structure or the second data structure, the device is to:
search the first data structure using the layer 2 information without using the layer 7 information, and
search the second data structure using the layer 2 information, the layer 3 information, the layer 4 information, and the layer 7 information when the first data structure does not store the information regarding the configuration data of the particular virtual private network;
drop the data packet when the first data structure and the second data structure do not store the information regarding the configuration data of the particular virtual private network; and
when the first data structure or the second data structure stores the information regarding the configuration data of the particular virtual private network:
identify policies included in the configuration data of the particular virtual private network;
determine that the policies include one or more firewall policies corresponding to the particular virtual private network;
cause the one or more firewall policies to be applied to the data packet;
dynamically allocate security system resources based on causing the one or more firewall policies to be applied to the data packet,
the security system resources including firewall services associated with the one or more firewall policies; and
route the data packet to the particular virtual private network after the one or more firewall policies have been applied to the data packet.

11. The system of claim 10, where the device is further to:
partition the security system resources into a plurality of separate security domains,
each of the plurality of separate security domains is to enforce one or more policies relating to a corresponding subsystem of subsystems associated with the plurality of separate security domains, and
dynamically allocate the security system resources to a subsystem, of the subsystems associated with the plurality of separate security domains, when a corresponding one of the plurality of separate security domains is to enforce the one or more policies relating to the subsystem.

12. The system of claim 11, further comprising a second device to provide a particular service domain,
the particular service domain is to enforce one or more policies for each of the plurality of separate security domains.

13. The system of claim 12, where the second device includes a user interface for presenting, adding, and modifying policies associated with each subsystem, of the subsystems associated with the plurality of separate security domains, and the one or more policies associated with the particular service domain.

14. The system of claim 12, where the particular service domain includes a global address book.

15. The system of claim 11, where the one or more policies for each subsystem, of the subsystems associated with the plurality of separate security domains, include one or more: policies for incoming data packets, policies for outgoing packets, policies for virtual tunneling, authentication policies, traffic regulating policies, or firewall policies.

16. The system of claim 15, where the policies for virtual tunneling include a policy associated with one or more tunneling protocols.

17. The system of claim 11, where one or more of the plurality of separate security domains include a unique address book.

18. The system of claim 11, where a particular security domain, of the plurality of separate security domains, is associated with the particular virtual private network, and
where the subsystem, corresponding to the particular security domain, includes a computer network.

19. The system of claim 11, where a particular security domain, of the plurality of separate security domains, is associated with the particular virtual private network, and
where the subsystem, corresponding to the particular security domain, includes a device connected to a computer network.

20. The system of claim 11, where each security domain, of the plurality of separate security domains, is associated with a user interface for presenting and modifying a set of policies relating to a corresponding subsystem.

21. The system of claim 10, where the security system resources further include authentication services.

22. The system of claim 10, where the security system resources further include virtual private network (VPN) services.

23. The system of claim 10, where the security system resources further include traffic management services.

24. The system of claim 10, where the security system resources further include encryption services.

25. The system of claim 10, where the security system resources further include one or more of: administrative tools, logging, counting, alarming, notification facilities, or resources for setting up additional subsystems.

26. A non-transitory computer-readable medium storing instructions, the instructions comprising:
    a plurality of instructions which, when executed by a device, cause the device to:
        associate a set of firewall configuration settings with each of a plurality of virtual local area networks;
        receive a data packet;
        obtain layer information from the data packet,
            the layer information including layer 2 information, layer 3 information, layer 4 information, and layer 7 information;
        search, using the layer 2 information without using the layer 7 information, a data structure to determine whether the data structure stores information regarding configuration data of a particular virtual local area network of the plurality of virtual local area networks,
            the data packet being destined for the particular virtual local area network,
            the data structure storing information regarding configuration data of one or more of the plurality of virtual local area networks;
        when the data structure does not store the information regarding the configuration data of the particular virtual local area network:
            search another data structure to determine whether the other data structure stores the information regarding the configuration data of the particular virtual local area network of the plurality of local area networks,
                the other data structure being searched using the layer information including the layer 2 information, the layer 3 information, the layer 4 information, and the layer 7 information;
        drop the data packet when the data structure and the other data structure do not store the information regarding the configuration data of the particular virtual local area network;
        identify information included in the configuration data of the particular virtual local area network when the data structure or the other data structure stores the information regarding the configuration data of the particular virtual local area network;
        determine that the configuration data of the particular virtual local area network includes the set of firewall configuration settings associated with the particular virtual local area network;
        process the data packet based on the set of firewall configuration settings associated with the particular virtual local area network; and
        output the data packet toward the particular virtual local area network after processing the data packet based on the set of firewall configuration settings.

27. The non-transitory computer-readable medium of claim 26, the instructions further comprising:
    one or more instructions to apply a traffic policy to the data packet,
        the traffic policy being applied to all data packets processed by the device.

28. The non-transitory computer-readable medium of claim 26, the instructions further comprising:
    one or more instructions to apply authentication policies that relate to one or more of:
        network address translation,
        a policy associated with mobile Internet protocol,
        a policy associated with virtual Internet protocol, or
        user authentication.

29. The non-transitory computer-readable medium of claim 26, where the set of firewall configuration settings, associated with the particular virtual local area network, include incoming policies and outgoing policies for a virtual local area network destination associated with the particular virtual local area network.

30. The non-transitory computer-readable medium of claim 26, the instructions further comprising:
    one or more instructions to determine available resources for outputting the data packet toward the particular virtual local area network,
        the resources being definable by a user, and
    where one or more instructions, of the plurality of instructions, to output the data packet comprise:
        one or more instructions to output the data packet toward the particular virtual local area network based on the determined available resources.

* * * * *